No. 677,592. Patented July 2, 1901.
H. W. PATRICK.
CLUTCH.
(Application filed June 9, 1900.)
(No Model.)
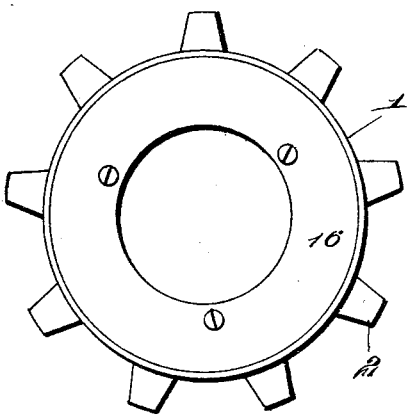
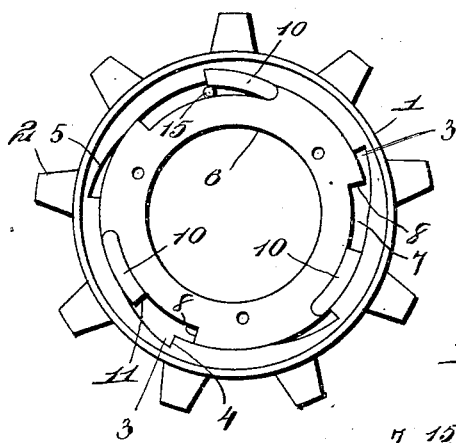
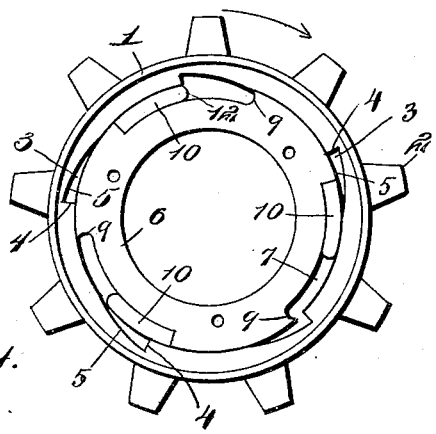
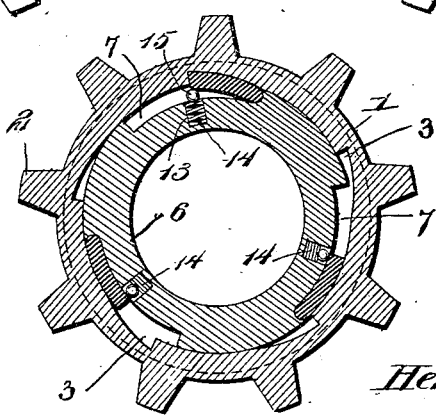
Witnesses
Louis D. Heinrichs
Hubert D. Lawson
Inventor
Henry W. Patrick
By Victor J. Evans
Attorney
THE NORRIS PETERS CO., PHOTO-LITHO., WASHINGTON, D. C.

UNITED STATES PATENT OFFICE.

HENRY WILLIAM PATRICK, OF BIRMINGHAM, ENGLAND.

CLUTCH.

SPECIFICATION forming part of Letters Patent No. 677,592, dated July 2, 1901.

Application filed June 9, 1900. Serial No. 19,790. (No model.)

*To all whom it may concern:*

Be it known that I, HENRY WILLIAM PATRICK, a subject of the Queen of England, residing at Birmingham, in the county of Warwick, England, have invented certain new and useful Improvements in Clutches, of which the following is a specification.

This invention relates to new and useful improvements in driving-clutches, and is especially adapted for use upon sprockets of velocipedes, &c. Its primary object is to provide a device of this character adapted to permit one of the parts to rotate in one direction independently of the adjacent part, but which parts will rotate in unison when the movement thereof is reversed.

A further object is to provide a device of this character which is noiseless in operation, which is of simple construction, cheap to manufacture, and which is effective in use.

To these ends the invention consists in providing a circular inner disk or plate which fits snugly and is revoluble within a ring or annulus provided with suitably-arranged recesses. The inner disk or plate is also recessed to provide long circumferential recesses, and slidably mounted within each recess is a pawl or slide, which is approximately about one-half the length of the recess within which it is mounted, but slightly longer than the recess of the annulus. Adjacent to the center of each circumferential recess within the disk is provided a second radial recess, within which is mounted a spring of suitable construction, which bears upon a ball or other similar device, which in turn is adapted to bear against either end of the slide or pawl hereinbefore referred to, according to the position of the slide or pawl with relation thereto.

The invention also consists in the further novel construction and combination of parts hereinafter more fully described and claimed, and illustrated in the accompanying drawings, showing the preferred form of my invention, and in which—

Figure 1 is a detail view of a sprocket having my improved clutch applied thereto. Fig. 2 is a side elevation with the face-plates removed, showing a sprocket having my improved clutch applied thereto and in driving position. Fig. 3 is a similar view showing the sprocket released from engagement with the slides of the inner disk, and Fig. 4 is a central longitudinal section through the sprocket and disk.

Referring to said figures by numerals of reference, 1 is a ring or annulus having sprocket-teeth, as 2, projecting from the outer edge thereof and provided upon its inner edge with suitably-arranged recesses 3. These recesses are each preferably provided with a squared end, as 4, and an inclined inner surface 5.

Within the ring 1 is mounted a circular disk 6, which fits snugly, but is revoluble therein, and which is provided within its outer edge with long circumferential recesses 7, each of which is provided with a squared end 8, a concave end 9, and an inner surface, which is concentric to the outer edge of the disk. Within each recess is slidably mounted a pawl or slide 10, preferably provided with a squared end 11 and a convex end 12, and said pawl is approximately about one-half the length of the recess within which it is mounted, but of greater length than the recesses of the annular ring 1.

The disk 6 is provided, preferably, at the center of each circumferential recess 7 with a second radial recess 13, within which is mounted a spring, as 14, which is adapted to bear upon a ball 15 upon the inner surface of the slide 10. This ball is so located as to bear upon said slide near its squared end when the convex end thereof is bearing within the corresponding end of the recess and to bear upon the slide at a point adjacent to the convex end when the squared end thereof is seated adjacent to the squared end of the recess.

In operation when the inner disk is driven in the direction of the arrow, Fig. 3, the slides will, as is obvious, assume the position shown in said figure. When the motion of the disk is reversed, however, the convex ends of the slides will abut against the concave ends of the recesses 7, thereby carrying the ball 15 over the center of said pawls, causing the pawl which is above the recess 3 to tilt downward upon the outer edge of the inclined surface 5 thereof and bring its squared end 11 into engagement with the corresponding end 4 of the recess, thereby effectually locking the parts together in a noiseless manner. When the inner disk is again revolved in the direction of the arrow, the convex ends of the pawls will, as is obvious, ride smoothly and noiselessly over the inclined surface of the recesses 3.

The ring 1 and its inner disk 6 may be held in proper relation to each other in any desired manner; but I preferably secure to the inner disk, at each side thereof, a face-plate, as 16, which overlaps the inner edge of the annulus 1.

While I have described this invention as especially adapted for use upon sprockets of velocipedes, &c., I do not limit myself to such use, as the same may, if desired, be employed upon the crank axle or shaft as means of applying a back-pedaling brake or coaster.

In the foregoing description I have shown the preferred form of my invention; but I do not limit myself thereto, as I am aware that modifications may be made therein without departing from the scope or sacrificing the spirit thereof, and I therefore reserve the right to make such changes as fairly fall within the scope of my invention.

Having thus fully described my invention, what I claim as new, and desire to secure by Letters Patent, is—

1. A clutch comprising a ring having a recess, a disk having a long circumferential recess and working snugly within the ring, a sliding pawl of approximately one-half the length of the circumferential recess and adapted to move back and forth therein, and means adapted to bear against either end of the sliding pawl according to the position of the latter with relation thereto to throw the sliding pawl in or out of the recess in the ring.

2. A clutch comprising a ring having a recess, a disk having a long circumferential recess and working snugly within the ring, a sliding pawl of approximately one-half the length of the circumferential recess and adapted to move back and forth therein, and a spring located in the disk and adapted to bear against either end of the sliding pawl according to the position of the latter with relation thereto to throw the sliding pawl in or out of the recess in the ring.

3. In a clutch, the combination with a recessed disk; of a pawl movable longitudinally within said recess, and a spring-controlled ball contacting with the pawl and adapted to automatically tilt the same into the recess in the ring only when the pawl is moving in one direction.

4. In a clutch, the combination with a recessed disk, of a pawl slidably mounted therein and having a convex end, a spring-controlled ball mounted within the disk and operating upon said pawl, and a ring inclosing the disk provided with a recess having an inclined inner surface, said ball adapted to automatically project the pawl into engagement with the walls of the recess within the ring.

5. In a clutch, the combination with a recessed disk; of a pawl slidably mounted therein and having a convex end, a spring mounted within the disk, a ball seated upon said spring and bearing upon the inner surface of the pawl, a recessed ring inclosing the disk, said ball adapted to automatically project the pawl into engagement with the walls of the recess within the ring, and face-plates secured to said disk and overlapping the inner edges of the ring.

6. In a clutch, the combination with a recessed disk; of a pawl movable longitudinally within said recess, a recessed ring mounted upon the disk, and a spring-controlled ball contacting with the pawl and adapted to automatically tilt the same into a recess in the ring when the pawl is at one end of its recess and to hold the same out of engagement with the recesses in the ring when said pawl is at the opposite end of its recess.

In testimony whereof I affix my signature in presence of two witnesses.

HENRY WILLIAM PATRICK.

Witnesses:
 FREDERICK JOHN EDWARDS,
 JOHN HERBERT CHANDLER.